(12) United States Patent
Ruch

(10) Patent No.: US 6,360,701 B1
(45) Date of Patent: Mar. 26, 2002

(54) METHOD FOR OPERATING A FOUR STROKE DIESEL ENGINE

(75) Inventor: Henri Ruch, Mettendorf (CH)

(73) Assignee: Waertsilae NSD Schweiz AG, Winterthur (CH)

( * ) Notice: Subject to any disclaimer, the term of this patent is extended or adjusted under 35 U.S.C. 154(b) by 0 days.

(21) Appl. No.: 09/691,525

(22) Filed: Oct. 18, 2000

(30) Foreign Application Priority Data

Nov. 10, 1999 (EP) .............................. 99811033

(51) Int. Cl.⁷ ................................. F02B 47/00
(52) U.S. Cl. ................... 123/25 C; 123/568.14
(58) Field of Search ............. 123/25 C, 568.14

(56) References Cited

U.S. PATENT DOCUMENTS

| | | | |
|---|---|---|---|
| 3,672,341 A | * 6/1972 | Smith et al. | 123/25 C |
| 5,832,880 A | 10/1998 | Dickey | 123/25 C |
| 5,875,743 A | 3/1999 | Dickey | 123/25 C |

FOREIGN PATENT DOCUMENTS

| | | |
|---|---|---|
| DE | 3237305 A1 | 4/1984 |
| DE | 4301887 A1 | 7/1994 |
| EP | 0553364 A1 | 8/1993 |
| JP | 62-99618 | * 5/1987 |

* cited by examiner

Primary Examiner—Noah P. Kamen
(74) Attorney, Agent, or Firm—Townsend and Townsend and Crew LLP

(57) ABSTRACT

A method is proposed for operating a four stroke diesel engine, in which method water is injected into a cylinder (2) in which a reciprocable piston (3) is arranged, and which cylinder (2) has at least one outlet (7) for conducting off exhaust gases as well as at least one intake (8) for supplying air, with the outlet (7) being closed during the exhaust stroke of the piston (3) so that the outlet (7) is already closed before the piston (3) reaches the upper idle dead center at the end of the exhaust stroke, and with water being injected into the cylinder (2) when the piston (3) is located in the region of the upper idle dead center.

10 Claims, 2 Drawing Sheets

METHOD FOR OPERATING A FOUR STROKE DIESEL ENGINE

The invention relates to a method for operating a four stroke diesel engine in accordance with the preamble of the independent claim and to a four stroke diesel engine which is operated using this method.

BACKGROUND OF THE INVENTION

During the operation of diesel internal combustion engines considerable amounts of polluting nitrogen oxides (NOx) arise in general. This also holds in particular for large diesel engines, such as are for example used as main drive aggregates for ships or as stationary plants for generating electricity. To protect the environment, therefore, considerable effort has been invested in developing diesel engines with significantly reduced NOx emission. The reduction of the NOx emission can for example be realized by means of selective catalytic reduction of the nitrogen oxides. In particular in large diesel engines however for reasons of space it is often very difficult—if at all possible—to provide correspondingly dimensioned catalytic converter apparatuses. Therefore the development of so-called primary measures was concentrated on, in which the generation of the nitrogen oxides in the combustion chamber of the cylinder is reduced.

It is a known measure in diesel engines to inject water into the combustion chamber in addition to the fuel in order thereby to reduce the combustion temperature, in particular the peak temperature arising at the flame, through which a reduction of the NOx formation and thus of the NOx emission of the engine results. The water is injected into the combustion chamber of the cylinder during or already shortly prior to the combustion. In four stroke diesel engines it is usual to inject the water towards the end of the compression stroke e.g. at the same time as the fuel. The water can be introduced into the combustion chamber of the cylinder separately from the fuel; or a water-fuel emulsion is first produced, which is then injected into the cylinder.

Starting from this prior art, an object of the invention is to propose a simple method for operating a four stroke diesel engine, by means of which the nitrogen oxide emission of the four stroke diesel engine can be still further reduced in comparison with known operating methods without the necessity of a high apparative complexity or high costs.

The method for operating a four stroke diesel engine which satisfies this object is characterized by the features of the independent method claim.

SUMMARY OF THE INVENTION

Thus in accordance with the invention a method is proposed for operating a four stroke diesel engine, in which method water is injected into a cylinder in which a reciprocable piston is arranged, and which cylinder has at least one outlet for conducting off exhaust gases as well as at least one intake for supplying air, with the outlet being closed during the exhaust stroke of the piston so that the outlet is already closed before the piston reaches the upper idle dead center at the end of the exhaust stroke, and with water being injected into the cylinder when the piston is located in the region of the upper idle dead center.

Since the outlet of the cylinder is already closed before the piston reaches the upper idle dead center at the end of the exhaust stroke, in each case a portion of the exhaust gases which have arisen during the previous combustion process are retained in the cylinder. Water is injected into the still hot exhaust gases when the piston is located in the region of the upper idle dead center. From this there results a very good vaporizing of the injected water and an efficient cooling down of the exhaust gases which are still located in the cylinder. In the subsequent intake stroke fresh air flows into the cylinder and forms a mixture with the retained exhaust gases and the water vapor. This mixture has a reduced oxygen concentration in comparison with the fresh air. The mixture is compressed in the next compression stroke. At the end of the compression stroke fuel is injected into the mixture. As a result of the reduced oxygen concentration of the mixture and of the water vapor contained therein, significantly less nitrogen oxides arise during the subsequent combustion process, through which an operation of the diesel engine with low pollution is enabled. In addition the method in accordance with the invention can be carried out without significant additional cost and complexity, which is advantageous in regard to economical aspects.

Thus in the method in accordance with the invention a worsened or reduced scavenging, respectively, is intentionally realized in the sense that the scavenging of the exhaust gases out of the cylinder is incomplete. Through the combination of said retention of exhaust gases in the cylinder, which can be designated as internal exhaust gas recirculation, with the water injection the formation of nitrogen oxides during the combustion process is significantly reduced without concessions in regard to the economy of the motor being required. In the method in accordance with the invention both the retained exhaust gases and the water vapor contribute to reduce the NOx formation.

Since the water injection into the cylinder takes place when the piston is located in the region of its upper idle dead center, there further results the advantage that the cylinder liner is protected against a charging with water, so that the water can exert no disadvantageous or damaging influence on the oil film which is located on the surface of the cylinder.

The achieved cooling down of the hot exhaust gases which are retained in the cylinder can be controlled in a simple manner via the amount of the injected water.

In practice it has proved advantageous that the outlet is closed in such a manner that it is just completely closed at a crank angle of 30 °±20° ahead of the upper idle dead center. From this there results a favorable amount of exhaust gas which is retained in the cylinder. This amount of exhaust gas can be set or regulated respectively via the closing time points for the outlet.

The intake is preferably opened during the intake stroke, which means after passing through the upper idle dead center, so that the intake is still closed when the piston is located in the region of the upper idle dead center. Through this measure it is ensured that the intake or the intake passage respectively is not contaminated by the backwardly flowing exhaust gases. It has proved particularly advantageous to open the intake at a crank angle of 30 °±20° after the upper idle dead center.

The injection of the water preferably begins after the outlet is closed during the exhaust stroke and ends before the intake is opened during the intake stroke. Hereby, a particularly efficient cooling down of the hot exhaust gases which are still located in the cylinder can be achieved by the injected water and a particularly good vaporization of the injected water can be achieved.

From the practical point of view it is advantageous when the injection of the water takes place over a crank angle range of about 20° ahead of the upper idle dead center to about 20° after the upper idle dead center.

As a further advantageous measure for reducing the nitrogen oxides which arise during the combustion process water can additionally be injected into the cylinder during the compression stroke and/or during the combustion. Thereby, the combustion temperature in the combustion chamber can be reduced.

Said water can be injected into the cylinder during the compression stroke at the same time as the fuel.

In particular in regard to the apparative cost and complexity and the amount of space available at the cylinder it can be advantageous to inject the water into the cylinder by means of the same injection nozzle by means of which the fuel is injected. For this the injection nozzle can be executed as a so-called tandem nozzle which has two separate injection passages with in each case associated nozzle holes, with the one injection passage being used for the water injection and the other injection passage being used for the fuel injection. It is however also possible to use a conventional injection nozzle with only one injection passage. When the piston is located in the region of the upper idle dead center, water is injected into the cylinder through this injection nozzle, which brings about the additional advantage of a cooling of the injection nozzle. Then towards the end of the compression stroke, fuel or a fuel-water emulsion is injected into the combustion chamber of the cylinder through the same injection passage.

The water is preferably injected at a pressure of at least 200 bar in order to achieve as fine an atomization of the water as possible.

In accordance with the invention a four stroke diesel engine which is operated with a method in accordance with the invention is furthermore proposed.

Further advantageous measures and preferred embodiments of the subjects of the invention result from the subordinate claims.

BRIEF DESCRIPTION OF THE DRAWINGS

The invention will be explained in the following in more detail with reference to exemplary embodiments and with reference to the drawings. Shown in the schematic drawings are.

DETAILED DESCRIPTION OF THE INVENTION

Figure 1:
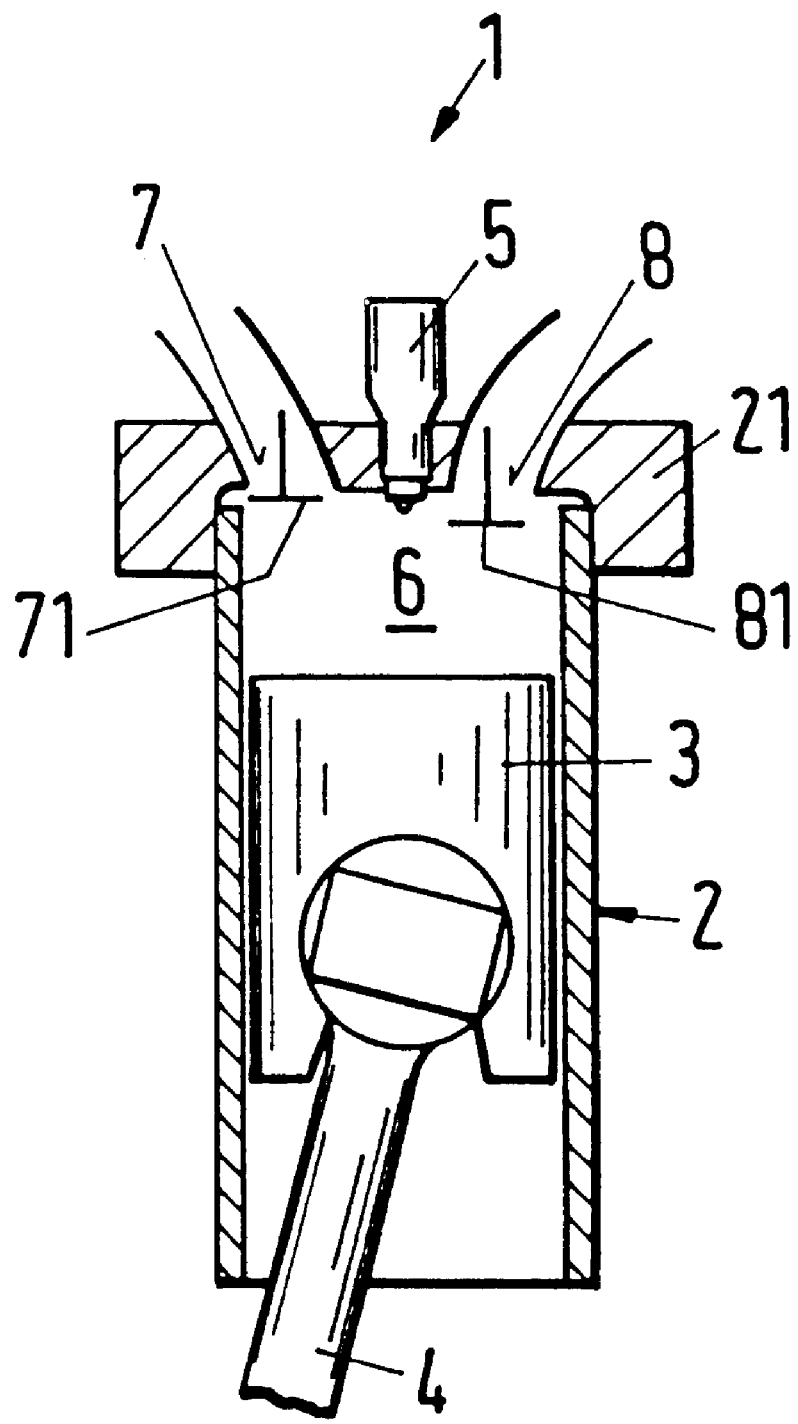
FIG. 1 a section through a cylinder of a four stroke diesel engine.

FIG. 1 shows in a schematic illustration a section through one of the usual plurality of cylinders 2 of a four stroke diesel engine, for example of a large diesel engine, which is designated in its entirety by the reference symbol 1. The cylinder 2 is closed off at its upper end in the illustration by a cylinder head 21. A reciprocable piston 3 is arranged in the cylinder 2. The piston 3 is connected via a connecting rod 4 to a crankshaft. A centrally arranged injection nozzle 5 is provided in the cylinder head 21 by means of which fuel can be injected into the combustion chamber 6 of the cylinder. Furthermore, at least one outlet 7 for conveying off combustion gases and one intake 8 for supplying air, which is usually designated as scavenging air, are provided in the cylinder head 21. In the here described four stroke diesel engine 1 two outlets 7 and two intakes 8 are respectively provided, which are arranged around the injection nozzle 5. In FIG. 1 only one outlet 7 and one intake 8 can be seen. For each outlet 7 or for each intake 8, respectively, an outlet valve 71 or an intake valve 81, respectively, is in each case provided, by means of which the outlet 7 or the intake 8, respectively, can be opened and closed.

As is known, the four-stroke process comprises the following four strokes: an intake stroke in which the piston 3 moves from the upper dead center to the lower dead center and fresh air is sucked into the cylinder 2, a compression stroke in which the piston 3 moves from the lower to the upper dead center and at the end of which fuel is injected into the combustion chamber 6, an expansion stroke in which the piston 3 moves from the upper to the lower dead center, and an exhaust stroke in which the piston 3 moves from the lower to the upper dead center and expels the exhaust gases from the cylinder 2.

For a better differentiability the upper dead center which the piston 3 passes through between the exhaust stroke and the intake stroke and in which no fuel injection into the cylinder takes place will be designated in the following as the upper idle dead center (idle UDC). On the contrary the upper dead center which the piston 3 passes through between the compression stroke and the expansion stroke and in which fuel is injected into the cylinder 2 is designated as the upper ignition dead center (ignition UDC).

As is common in general the position of the piston 3 in the cylinder 2 will be described in the following by the crank angle KW. In accordance with convention the crank angle KW is 0° or 360° or 720°, respectively, when the piston 3 is located at the upper dead center. A complete duty cycle thus extends from KW=0° to KW=720° (two rotations).

Figure 2:
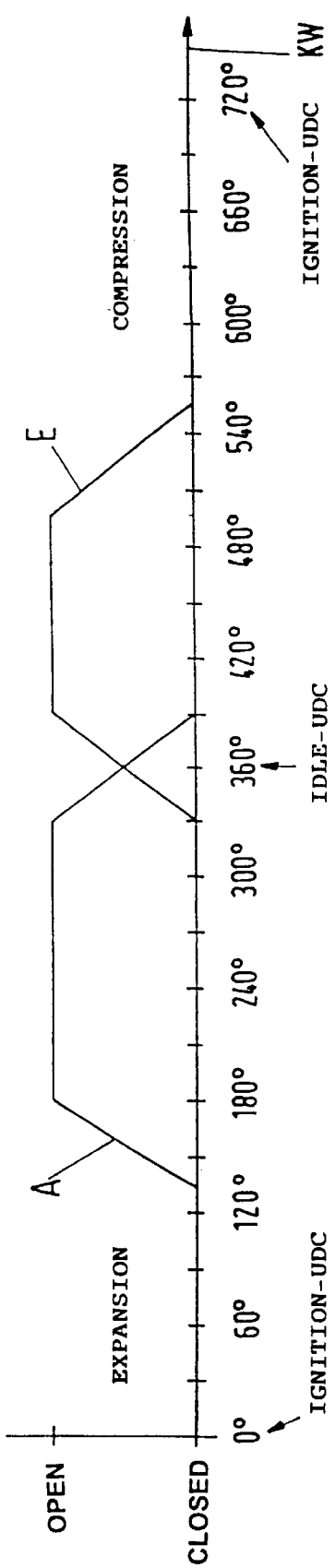
FIG. 2 a diagram for illustrating the control times for opening and closing the intake and outlet in a known method for operating a four stroke diesel engine, and FIG. 3 as FIG. 2, but for an exemplary embodiment of the method in accordance with the invention however.

FIG. 2 shows a diagram for illustrating the control times for opening and closing the intake 8 and the outlet 7 in a known method for operating a four stroke diesel engine. The crank angle KW is plotted in degrees on the horizontal axis and the two states "OPEN" and "CLOSED" for the outlet 7 and the intake 8 on the vertical axis. The curve for the outlet 7 is designated by A and the curve for the intake 8 by E.

The diagram begins at the left side at a crank angle KW=0°, in which the piston 3 is located at the ignition UDC. The fuel-air mixture in the combustion chamber 6 ignites. In the course of the subsequent expansion stroke the opening of the outlet 7 is begun at a crank angle KW=135°. During the passing through of the lower dead center (KW=180°) the outlet is completely opened. The exhaust stroke begins. During the exhaust stroke, in which the exhaust gases are expelled out of the cylinder 2, the closing of the outlet 7 and the opening of the intake 8 is begun at KW=330°, that is, 30° ahead of the idle UDC. The piston 3 passes through the idle UDC (KW=360°) and the intake stroke begins. At a crank angle KW=390° the outlet 7 is just completely closed and the intake 8 is just completely opened. It can be recognized that in the crank angle range from 30° ahead of the idle UDC to 30° after of the idle UDC both the outlet 7 and the intake 8 are partly opened. In this region the scavenging of the cylinder 2 takes place, which means that fresh air can already flow in into the cylinder 2 through the already partly opened intake 8, is mixed there with the residues of the exhaust gases and is expelled together with the latter, since the outlet 7 is not yet completely closed. After the outlet 7 is completely closed (KW=390°) during the intake stroke, the loading of the cylinder 2 with fresh air begins. In the further course of the intake stroke the closing of the intake 8 is begun at a crank angle KW=495°. Shortly after passing through the lower dead center (KW=540°) the intake 8 is completely closed. In the now following compression stroke the fresh air in the cylinder 2 is compressed. Towards the end of the compression stroke the injection of the fuel into the compressed fresh air takes place. In the region of the ignition UDC (KW=720°; on the right in FIG. 2) the fuel-air mixture ignites and the cycle begins anew.

Figure 3:
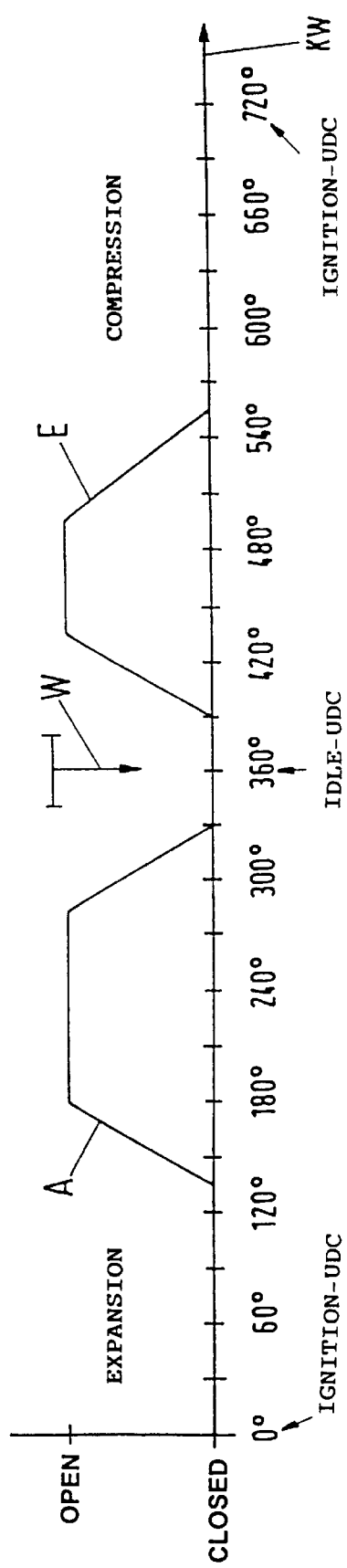

In an illustration which is analogous to FIG. 2, FIG. 3 illustrates a preferred exemplary embodiment of the method in accordance with the invention for operating a four stroke diesel engine. The reference symbols have the same meaning as in FIG. 2.

During the expansion stroke the opening of the outlet 7 is begun at a crank angle KW=135°. When the lower dead center is reached (KW=180°) the outlet 7 is just completely opened. During the following exhaust stroke the closing of the outlet 7 is already begun at about KW=280° so that the outlet 7 is just completely closed at a crank angle KW=330°, that is 30° before reaching the idle UDC. While the piston 3 is located in the region of the idle UDC (KW=360°) water is injected into the combustion chamber 6 of the cylinder 2, as the arrow with the reference symbol W symbolically indicates. The injection of the water preferably takes place over a crank angle range from about 20° ahead of the idle UDC to about 20° after the idle UDC. Only during the intake stroke at a crank angle KW=390° does the opening of the intake 8 begin, which means that the intake 8 is still completely closed when the piston 3 is located at the idle UDC. At a crank angle KW of about 435° the intake 8 is completely opened. The closing of the intake 8 is begun towards the end of the intake stroke at a crank angle KW=495°. After passing through the lower dead center (KW=540°) the intake 8 is just completely closed at a crank angle KW=555°. Then the compression begins, at the end of which fuel is injected into the combustion chamber 6. In the region of the ignition UDC (KW=720°; on the right in FIG. 3) the mixture ignites and a new expansion stroke begins.

Through the measure in accordance with the invention of closing the outlet 7 during the exhaust stroke in such a manner that outlet 7 is already completely closed prior to reaching the idle UDC, a portion of the exhaust gases which arose in the last combustion process is retained in the cylinder 2. During the passing through of the idle UDC, that is, temporally separated significantly prior to the combustion, water is injected into these retained, still hot exhaust gases at a high pressure of about 200 bar–1000 bar. The water atomizes, vaporizes in the hot exhaust gases and cools down the latter. A mixture of exhaust gases and water vapor arises which mixes with the fresh air which flows in through the intake 8 during the intake stroke. This mixture of exhaust gas, water vapor and fresh air is compressed in the following compression stroke. Towards the end of the compression stroke fuel is injected into this mixture. The combustion then takes place in the region of the ignition UDC. Since the compressed mixture of exhaust gases, water vapor and fresh air has a significantly lower oxygen content in comparison with fresh air, significantly fewer nitrogen oxides arise in the combustion process. In addition the formation of NOx is reduced through the water vapor content of the compressed mixture.

For the injection of the water a plurality of variants are possible. Thus for example a separate water injection nozzle can be provided in the cylinder head 21. It is also possible to inject the water into the cylinder 2 by means of the same injection nozzle 5 by means of which the fuel is injected. This means that when the piston 3 passes the idle UDC, water is injected into the combustion chamber 6 by means of the injection nozzle 5 and when the piston 3 approaches the ignition UDC, fuel is injected by means of the same injection nozzle 5. A further possibility consists in using a tandem nozzle as injection nozzle 5. A tandem nozzle has two separate injection passages with in each case associated nozzle holes, with the one injection passage being used for the water injection and the other injection passage being used for the fuel injection.

The achieved cooling down of the exhaust gases which are retained in the cylinder 2 can be very simply controlled, namely via the amount of the injected water. The amount of the exhaust gases which are retained in the cylinder 2 can also be set or regulated respectively in a simple manner, namely via the control times for the closing of the outlet 7 so that the reduction of the NOx formation can be optimized. In practice it has proved particularly advantageous to close the outlet 7 during the exhaust stroke in such a manner that it is just completely closed at a crank angle KW of 30°±20° ahead of the upper idle dead center.

As can be seen in the diagram in FIG. 3, the closing of the outlet 7 and the opening of the intake 8 preferably takes place symmetrically to the idle UDC, which means that the intake 8 is preferably opened during the intake stroke at a crank angle KW of 30°±20° after the idle UDC, so that the intake 8 is still closed when the piston 3 is located at the idle UDC. In particular at no point in time of the duty cycle are both the outlet 7 and the intake 8 opened. The measure of the late opening of the intake 8 is advantageous because thereby a backward flowing of exhaust gases through said intake 8 into the adjoining intake passage and thus a contamination of this intake passage is effectively prevented.

The water injection for the cooling off of the exhaust gases which are retained in the cylinder 2 is particularly efficient when the injection of the water in the region of the idle UDC begins only when the outlet 7 is already completely closed and ends before the opening of the intake 8 is begun in the intake stroke.

The water injection preferably takes place symmetrically to the idle UDC. Hereby, it is namely ensured that the surface of the cylinder is protected as well as possible by the piston 3 from a charging with water. A disadvantageous or damaging influencing of the oil film which is located on the cylinder bore is thus avoided.

In accordance with an advantageous variant of the method in accordance with the invention water can also be injected into the cylinder during the compression stroke and/or during the combustion in addition to the water injection in the region of the idle UDC. Thereby, the combustion temperature in the combustion chamber can namely be reduced, whereby the amount of the nitrogen oxides which arise in the combustion process can be reduced still further. This second water injection can for example begin approximately at the middle of the compression stroke—that is, at a crank angle of about 630°. This second water injection can take place parallel to or at the same time as the fuel injection respectively and be continued during the combustion process.

Thus through the invention a method for operating a four stroke diesel engine is proposed in which an incomplete expulsion of the exhaust gases out of the cylinder 2 is knowingly and intentionally realized so that a portion of the exhaust gases which arise in the combustion process are in each case retained in the cylinder 2. These retained exhaust gases are cooled down through a water injection in the region of the upper idle dead center. Through the retention of a portion of the exhaust gases as well as the water vapor, significantly fewer nitrogen oxides arise in the subsequent combustion process without concessions in regard to the economy of the motor (e.g. fuel consumption) being necessary. Thus the formation of pollutants can be significantly reduced. An additional advantage of this emission-poor operating method is that it can be realized without a great additional cost and complexity.

What is claimed is:

1. Method for operating a four stroke diesel engine, in said method water being injected into a cylinder (2) in which a reciprocable piston (3) is arranged, and said cylinder (2) having at least one outlet (7) for conducting off exhaust gases as well as at least one intake (8) for supplying air, characterized in that said outlet (7) is closed during the exhaust stroke of the piston (3) so that the outlet (7) is already closed before the piston (3) reaches the upper idle dead center at the end of the exhaust stroke; and in that water is injected into the cylinder (2) when the piston (3) is located in the region of the upper idle dead center.

2. Method in accordance with claim 1, in which the outlet (7) is closed in such a manner that it is just completely closed at a crank angle (KW) of 30°±20° ahead of the upper idle dead center.

3. Method in accordance with claim 1, in which the intake (8) is opened during the intake stroke, in particular at a crank angle (KW) of about 30°±20° after the upper idle dead center, so that the intake (8) is still closed when the piston (3) is at the upper idle dead center.

4. Method in accordance with claim 1, in which the injection of the water begins after the outlet (7) is closed during the exhaust stroke, and ends before the intake (8) is opened during the intake stroke.

5. Method in accordance with claim 1, in which the injection of the water takes place over a crank angle range of about 20° ahead of the upper idle dead center to about 20° after the upper idle dead center.

6. Method in accordance with claim 1, in which water is injected into the cylinder (2) during the compression stroke and/or during the combustion.

7. Method in accordance with claim 6, in which the water is injected into the cylinder (2) during the compression stroke at the same time as the fuel.

8. Method in accordance with claim 1, in which the water is injected into the cylinder (2) by means of the same injection nozzle (5) by means of which the fuel is injected.

9. Method in accordance with claim 1, in which the water is injected with a pressure of at least 200 bar.

10. Four stroke diesel engine which is operated by using a method in accordance with claim 1.

* * * * *